US007809205B2

(12) United States Patent
Katougi

(10) Patent No.: US 7,809,205 B2
(45) Date of Patent: Oct. 5, 2010

(54) IMAGE PROCESSING METHOD, IMAGE PROCESSING APPARATUS, IMAGE FORMING APPARATUS AND RECORDING MEDIUM

(75) Inventor: Terumitsu Katougi, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1072 days.

(21) Appl. No.: 11/511,391

(22) Filed: Aug. 29, 2006

(65) Prior Publication Data

US 2007/0047829 A1 Mar. 1, 2007

(30) Foreign Application Priority Data

Aug. 30, 2005 (JP) ............................. 2005-250103

(51) Int. Cl.
*G06K 9/00* (2006.01)
*G06K 9/36* (2006.01)
*H04B 14/06* (2006.01)

(52) U.S. Cl. .................. 382/248; 382/100; 375/240
(58) Field of Classification Search ................. 382/254, 382/248
See application file for complete search history.

(56) References Cited

U.S. PATENT DOCUMENTS

| 6,078,615 A * | 6/2000 | Yamamoto et al. ........... 375/240 |
| 6,473,533 B1 * | 10/2002 | Yokose et al. ................ 382/248 |
| 6,584,225 B1 | 6/2003 | Moroney |
| 6,603,864 B1 * | 8/2003 | Matsunoshita .............. 382/100 |

FOREIGN PATENT DOCUMENTS

| JP | 6-189119 A | 7/1994 |
| JP | 9-54825 A | 2/1997 |
| JP | 2000-299783 A | 10/2000 |
| JP | 2001-143066 A | 5/2001 |
| JP | 2002-10085 A | 1/2002 |
| JP | 2003-337942 A | 11/2003 |
| JP | 2004-104336 A | 4/2004 |
| JP | 2004-326322 A | 11/2004 |
| JP | 2005-50296 A | 2/2005 |
| JP | 2005-57553 A | 3/2005 |
| JP | 2006-87072 A | 3/2006 |
| JP | 2006-155572 A | 6/2006 |

OTHER PUBLICATIONS

Takeshi Makita, Journal of the Image Society of Japan, 2001, vol. 40, No. 3, pp. 237-243.

* cited by examiner

*Primary Examiner*—Bhavesh M Mehta
*Assistant Examiner*—Hadi Akhavannik
(74) *Attorney, Agent, or Firm*—Birch, Stewart, Kolasch & Birch, LLP

(57) ABSTRACT

An image processing apparatus in which image data is transformed to spatial frequencies to obtain multiple frequency components, the obtained frequency components are processed, the processed frequency components are inversely transformed to image data, and the number of gray levels of the inversely transformed image data is decreased, and the image processing apparatus comprising a frequency component judgment section for comparing the absolute value of each of specific multiple frequency components in the multiple frequency components obtained after transformation to spatial frequencies with a predetermined value in terms of magnitude, a frequency component changing section for changing each of specific frequency components on the basis of the result of the comparison, and a noise addition section for adding a specific value to each of the specific frequency components having been changed and other frequency components.

20 Claims, 13 Drawing Sheets

FIG. 1
PRIOR ART

| 0 | 8 | 2 | 10 |
|---|---|---|---|
| 12 | 4 | 14 | 6 |
| 3 | 11 | 1 | 9 |
| 15 | 7 | 13 | 5 |

FIG. 6

| | | | | | | | | | | X ↑ |
|---|---|---|---|---|---|---|---|---|---|---|
| 48 | -88 | 24 | -24 | 65 | -104 | -7 | 99 | -44 | -112 | ⋮ |
| -45 | 105 | -68 | 89 | -60 | 106 | 47 | -77 | 0 | 117 | ⋮ |
| -108 | 14 | 59 | -97 | 11 | -17 | -122 | 27 | 66 | -103 | ⋮ |
| 83 | -72 | -33 | 114 | 42 | -82 | 127 | -58 | -24 | 101 | ⋮ |
| -126 | 49 | -3 | -117 | -54 | 66 | -6 | 84 | -86 | 43 | ⋮ |
| 123 | -52 | 90 | 38 | 102 | -32 | -112 | 51 | 15 | -98 | ⋮ |
| -84 | 22 | -98 | -18 | -87 | 19 | 109 | -58 | -16 | 73 | ⋮ |
| 113 | -12 | 82 | 13 | -52 | 71 | -3 | -92 | 98 | -118 | ⋮ |
| 57 | -64 | -123 | 55 | 114 | -106 | -39 | 50 | 5 | -30 | ⋮ |
| -36 | 107 | 1 | -44 | -81 | 17 | 66 | -65 | 126 | -76 | ⋮ |
| … | … | … | … | … | … | … | … | … | … | ⋱ |

| t \ s | | | | | | | | | | | ... |
|---|---|---|---|---|---|---|---|---|---|---|---|
| | -5.6 | -6.5 | 0.1 | -8.0 | 4.4 | -4.4 | -1.1 | -4.5 | -8.2 | 0.7 | ... |
| | -0.2 | -7.7 | -12.6 | -7.1 | -28.1 | 15.9 | -7.6 | -30.1 | 3.7 | 11.6 | ... |
| | -6.4 | -8.8 | 6.5 | -14.4 | 0 | 1.9 | 35.4 | 11.9 | -12.0 | -4.1 | ... |
| | -3.8 | -1.1 | -18.8 | 4.2 | -18.2 | -12.2 | -48.8 | -38.0 | 4.5 | 17.1 | ... |
| | -26.4 | -4.0 | -18.3 | 9.0 | -44.5 | 16.4 | -33.2 | -61.2 | -3.6 | 13.1 | ... |
| | 1.2 | 12.2 | -25.8 | 21.7 | -28.1 | 3.5 | 21.5 | -81.2 | 28.8 | 20.3 | ... |
| | 4.8 | -32.1 | 47.7 | 19.9 | 45.1 | -36.4 | -17.1 | 15.0 | -12.7 | -31.0 | ... |
| | -18.1 | 1.0 | -32.8 | -15.7 | 12.9 | -2.4 | 45.9 | 3.6 | 1.6 | 3.2 | ... |
| | 5.9 | 2.7 | 0.1 | -3.2 | 4.9 | 4.1 | -14.5 | -14.6 | 0.5 | 8.2 | ... |
| | 7.3 | -3.6 | -3.6 | 7.7 | -11.4 | -12.2 | 20.8 | -0.9 | -0.7 | 4.8 | ... |
| | ... | ... | ... | ... | ... | ... | ... | ... | ... | ... | ... |

○ : SMOOTHING ACCORDING TO JUDGMENT

● : EMPHASIZING ACCORDING TO JUDGMENT

△ : ALWAYS EMPHASIZING

IMAGE PROCESSING METHOD, IMAGE PROCESSING APPARATUS, IMAGE FORMING APPARATUS AND RECORDING MEDIUM

CROSS-REFERENCE TO RELATED APPLICATIONS

This non-provisional application claims priority under 35 U.S.C. §119(a) on Patent Applications No. 2005-250103 filed in Japan on Aug. 30, 2005, the entire contents of which are hereby incorporated by reference.

BACKGROUND OF THE INVENTION

The present invention relates to an image processing method, an image processing apparatus, an image forming apparatus and a recording medium in which image data is transformed to spatial frequencies to obtain multiple frequency components, the obtained frequency components are processed, the processed frequency components are inversely transformed to image data, and the number of gray levels of the inversely transformed image data is decreased.

As a method for decreasing the number of gray levels of an image, for example, as a method for binarizing an image having 256 gray levels to obtain an image having 2 gray levels, a method for carrying out binarization by comparing the gray level value of an image with a threshold value, a dither method, an error diffusion method, etc. (Japanese Patent Application Laid-Open No. 2000-299783, Japanese Patent Application Laid-Open No. H06-189119 and Japanese Patent Application Laid-Open No. 2002-10085) are known.

Figure 1:
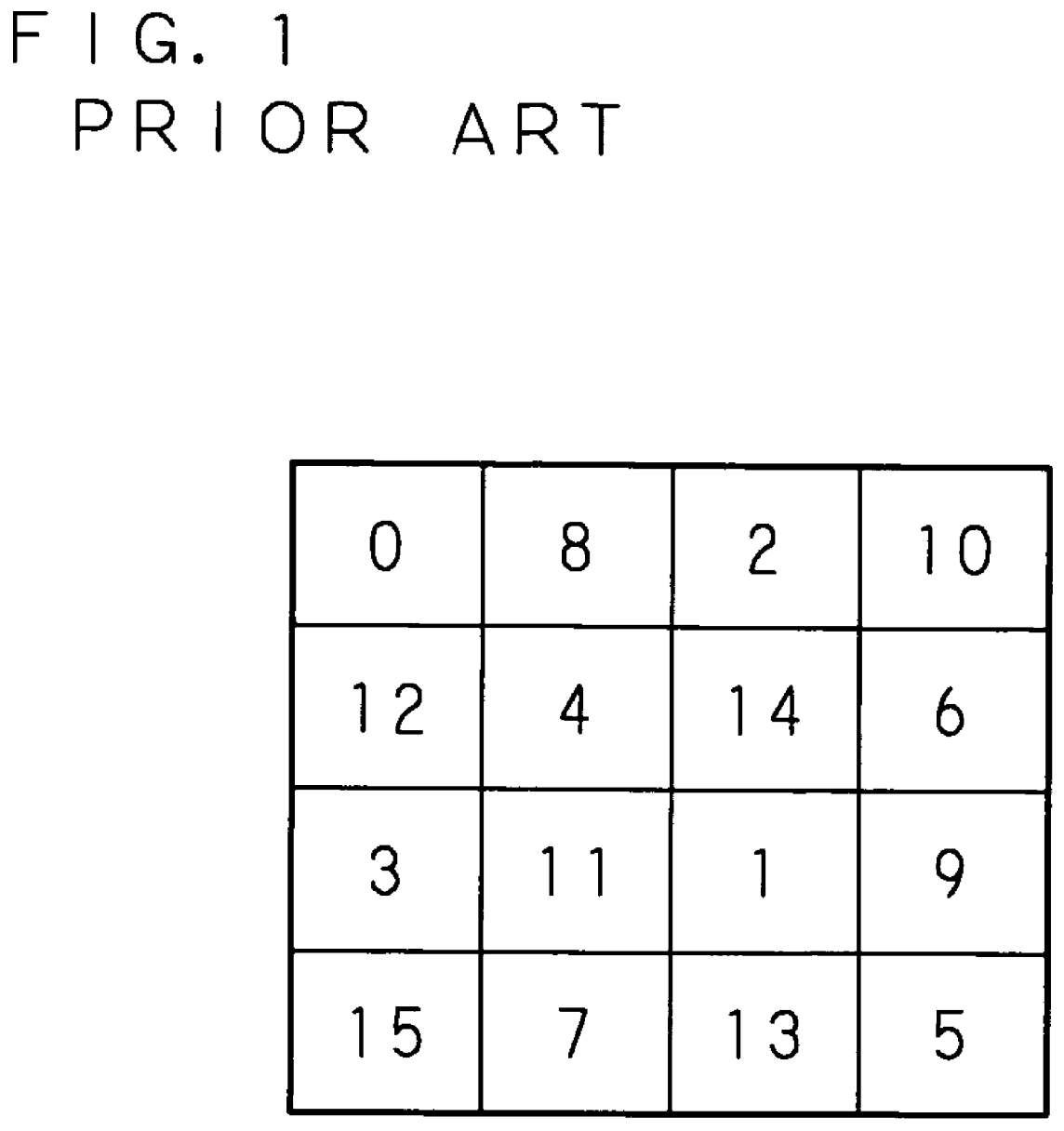

FIG. 1 is a view showing an example of a 4×4 dither matrix that is used for the dither method in which an image having 256 gray levels is binarized. In the dither matrix, any one of threshold values in the range of 0 to 15 is set according to the position of each of 4×4 pixels. In the dither method, the gray level value of each of 4×4 pixels of input image data having 256 gray levels is compared with the threshold value having been set in the dither matrix and corresponding to each pixel. In the case that the gray level value is equal to or more than the threshold value, the gray level value is set at 255. In the case that the gray level value is less than the threshold value, the gray level value is set at 0. In this way, the image is binarized.

In the error diffusion method, a quantization error occurring when each pixel of input image data is binarized, that is, the difference between the gray level value of a pixel before binarization and the gray level value of the pixel after binarization is distributed to pixels not yet binarized. In the case that a pixel to be binarized is assumed to be a current pixel, the error (quantization error) between the gray level value of the current pixel and the gray level value thereof after binarization is added to the gray level values of the pixels not yet binarized and positioned in the vicinity of the current pixel, after weighing is carried out according to the relative position from the current pixel.

FIG. 2 is a view showing an example of a weighing coefficient matrix being used for the error diffusion method. In the example shown in FIG. 2, a 2×3 weighing coefficient matrix including a current pixel $(I_X, I_Y)$ is shown, wherein the horizontal direction, that is, the right direction in the figure, is assumed to be the X direction, and the vertical direction, that is, the downward direction in the figure, is assumed to be the Y direction. The weighing coefficient matrix designates the weighing coefficients of the lower left pixel, the lower pixel, the lower right pixel and the right pixel adjacent to the current pixel $(I_X, I_Y)$. For example, the gray level value of the current pixel $(I_X, I_Y)$ is compared with a threshold value. In the case that the gray level value is equal to or more than the threshold value, the gray level value of the current pixel $(I_X, I_Y)$ is set to 255. In the case that the gray level value is less than the threshold value, the gray level value of the current pixel $(I_X, I_Y)$ is set to 0. Next, the difference between the binarized gray level value, 255 or 0, and the gray level value of the current pixel $(I_X, I_Y)$ before binarization, that is, a quantization error, is distributed to the adjacent pixels before binarization, on the basis of the weighing coefficient matrix. However, because the pixel $(I_{X-1}, I_Y)$ on the left side of the current pixel $(I_X, I_Y)$ has already been quantized earlier than the current pixel $(I_X, I_Y)$, the quantization error is not distributed to the left pixel.

In the case that the quantization error is assumed to be Err, Err×(7/16), Err×(1/16), Err×(5/16) and Err×(3/16) are distributed to the four pixels $(I_{X+1}, I_Y)$, $(I_{X+1}, I_{Y+1})$, $(I_X, I_{Y+1})$ and $(I_{X-1}, I_{Y+1})$ positioned adjacent to the current pixel $(I_X, I_Y)$, respectively. Because the quantization error components are distributed to the adjacent unprocessed pixels on the basis of the weighing coefficient matrix, the error diffusion method has an advantage of hardly causing moire patterns in binarized images in comparison with the dither method.

In addition, according to the method disclosed in Japanese Patent Application Laid-Open No. 2002-10085, image data is transformed to image data having spatial frequency components, and image halftone processing is carried out using the data transformed to halftone spatial frequency regions predetermined for the coefficients of the transformed spatial frequency components.

BRIEF SUMMARY OF THE INVENTION

However, since binarization is carried out using dither matrixes having the same patterns in the dither method, there is a problem of generating texture peculiar to the dither method, that is, periodic patterns, in a binarized image. Furthermore, because an error is diffused for each pixel on the basis of the same matrix in the error diffusion method, a large quantization error is diffused in a chain reaction at highlighted portions having large gray level values. This causes a problem in which pixels are connected to one another. More specifically, pixels having different gray level values are forced to have the same gray level value, and this may generate an image having pixels partly connected to one another. Still further, because predetermined halftone data is used in the method described in Japanese Patent Application Laid-Open No. 2002-10085, that is, because halftone processing is merely carried out in frequency regions using a method similar to the above-mentioned conventional method, there is a problem of generating texture or the like as in the case of the error diffusion method or the dither method.

In addition, the edges of an image are emphasized or smoothened. For example, the contour of a character or a continuous-tone image (for example, an image on a photographic paper) can be seen distinctly and clearly by emphasizing the edges thereof. Furthermore, the occurrence of moire in an image on a printed matter (for example, a printed photograph), composed of halftone dots, can be suppressed by smoothing the edges.

However, emphasizing and smoothing are carried out in block units. For example, because emphasizing is carried out by multiplying all the data in a block by a constant that is prepared beforehand, there is a problem of making unnecessary block noise that is conspicuous in the gentle curve regions of the contour of a face or the like. Similarly, for example, because smoothing is carried out by dividing all the data in a block by a constant that is prepared beforehand, there is a problem of making the edge portions blurry in the case that the edge components are included in the block.

In consideration of the above-mentioned circumstances, an object of the present invention is to provide an image processing method, an image processing apparatus, an image forming apparatus and a recording medium, capable of carrying out the mixture processing of emphasizing and smoothing in a block, capable of adding noise, and capable of obtaining more appropriate halftone images by comparing each of specific frequency components with a predetermined value in terms of magnitude, by changing each of the specific frequency components on the basis of the result of the comparison, and by adding a specific value to each of the specific frequency components having been changed and other frequency components.

In addition, another object of the present invention is to provide an image processing method and an image processing apparatus capable of obtaining curves with clear edges, wherein the specific frequency components in all frequency components are the frequency components on the low frequency side and the frequency components on the high frequency side only in the horizontal direction or only in the vertical direction of image data; in the case that the absolute value of the coefficient of each of the specific frequency components is larger than the predetermined value, the coefficient of the frequency component is increased.

Furthermore, still another object of the present invention is to provide an image processing method and an image processing apparatus capable of obtaining smoother halftone images, wherein the coefficients of frequency components, other than both the specific frequency components including the frequency components on the low frequency side and the frequency components on the high frequency side only in the horizontal direction or only in the vertical direction and the DC component of the image data, are decreased.

Moreover, yet still another object of the present invention is to provide an image processing method and an image processing apparatus capable of obtaining curves with clear edges, wherein the specific frequency components in all frequency components are frequency components excluding both the frequency components on the low frequency side and the DC component; in the case that the absolute value of the coefficient of each of the specific frequency components is larger than the predetermined value, the coefficient of the frequency component is increased.

Besides, a further object of the present invention is to provide an image processing method and an image processing apparatus capable of obtaining clearer halftone images, wherein the coefficients of frequency components other than both the DC component and the specific frequency components excluding the frequency components on the low frequency side and the DC component are increased.

Additionally, a still further object of the present invention is to provide an image processing method and an image processing apparatus capable of obtaining halftone images with clear edges, wherein, in the case that the absolute value of the coefficient of each of the specific frequency components is larger than the predetermined value, a correction coefficient is multiplied to the coefficient of each of the frequency components, the lower the frequency component, the smaller the correction coefficient, and the higher the frequency component, the larger the correction coefficient.

What's more, a yet still further object of the present invention is to provide an image processing method and an image processing apparatus capable of obtaining smoother halftone images, wherein, in the case that the absolute value of the coefficient of each of the specific frequency components is smaller than the predetermined value, the coefficient of the frequency component is decreased.

The image processing method according to the present invention is an image processing method in which image data is transformed to spatial frequencies to obtain multiple frequency components, the obtained frequency components are processed, the processed frequency components are inversely transformed to image data, and the number of gray levels of the inversely transformed image data is decreased, and the image processing method comprises the step of comparing the absolute value of each of specific multiple frequency components in the multiple frequency components obtained after transformation to spatial frequencies with a predetermined value in terms of magnitude, the step of changing each of the specific frequency components on the basis of the result of the comparison, the step of adding a specific value to each of the specific frequency components having been changed and other frequency components, and the step of inversely transforming the frequency components, to which the specific values have been added, to image data.

The image processing apparatus according to the present invention is an image processing apparatus in which image data is transformed to spatial frequencies to obtain multiple frequency components, the obtained frequency components are processed, the processed frequency components are inversely transformed to image data, and the number of gray levels of the inversely transformed image data is decreased, and the image processing apparatus comprises comparing means for comparing the absolute value of each of specific multiple frequency components in the multiple frequency components obtained after transformation to spatial frequencies with a predetermined value in terms of magnitude, changing means for changing each of the specific frequency components on the basis of the result of the comparison carried out using the comparing means, adding means for adding a specific value to each of the specific frequency components having been changed and other frequency components, and inversely transforming means for inversely transforming the frequency components, to which the specific values have been added, to image data.

In the present invention, the absolute value of each of specific frequency components is compared with a predetermined value in terms of magnitude, and each of the specific frequency components is changed on the basis of the result of the comparison. Hence, different changes can be carried out for a portion in which the absolute value of the frequency component is larger than the predetermined value and a portion in which the absolute value of the frequency component is equal to or less than the predetermined value. For example, because the portion in which the absolute value of the frequency component is larger than the predetermined value includes a characteristic component, such as an edge component, emphasizing can be carried out for the edge portion, and smoothing can be carried out for other portions. The frequency components can be changed by changing the coefficients of the frequency components. By the switching of different processing, such as emphasizing and smoothing, according to the result of the judgment for each of frequency components, the mixture processing of emphasizing and smoothing can be carried out in a block serving as a unit of transformation to the spatial frequencies. Hence, in the case that the switching is carried out between emphasizing and smoothing in block unit, judgment errors are suppressed, whereby it is possible to obtain more appropriate halftone images. In addition, by the addition of the specific values to the specific frequency components and other frequency components, it is possible to improve the dispersibility of pixels in highlighted regions and texture in intermediate density regions. As the specific values to be added to the frequency components, values based on blue noise difficult to be sensed by human eyes, for example, can be used. More appropriate halftone images can be formed on sheets by carrying out the above-mentioned processing for images to be formed on sheets. Furthermore, more appropriate halftone images can be obtained by carrying out the above-mentioned processing using a computer, for example. In the case that the above-mentioned processing is carried out using a computer, a program that is intended to cause the computer to carry out the above-mentioned processing and recorded on a recording medium can be read and executed.

With the present invention, the mixture processing of emphasizing and smoothing can be carried out in a block, and in the case that the switching is carried out between different processing, such as emphasizing and smoothing, in block unit, judgment errors are suppressed, whereby it is possible to obtain more appropriate halftone images. In addition, by the addition of the specific values to the specific frequency components and other frequency components, it is possible to improve the dispersibility of pixels in highlighted regions and texture in intermediate density regions.

The specific frequency components in all frequency components are the frequency components on the low frequency side and the frequency components on the high frequency side only in the horizontal direction or only in the vertical direction of image data. In the case that the absolute value of the coefficient of each of the specific frequency components is larger than the predetermined value, the coefficient of the frequency component is increased. Hence, not all the frequency components are emphasized, but only the frequency components judged to include characteristic portions, such as edge components, are increased and emphasized. As a result, unnecessary block patterns are suppressed from being generated in the edge boundary portions of a curve, whereby it is possible to obtain a curve with clear edges. The coefficients of the frequency components are the coefficients of the discrete cosine transform (DCT), for example.

The coefficients of frequency components, other than both the specific frequency components including the frequency components on the low frequency side and the frequency components on the high frequency side only in the horizontal direction or only in the vertical direction and the DC component of the image data, are decreased. Hence, the coefficients of the frequency components described above are decreased and smoothing is carried out, whereby smoother halftone images can be obtained.

The specific frequency components in all frequency components are frequency components excluding both the frequency components on the low frequency side and the DC component; in the case that the absolute value of the coefficient of each of the specific frequency components is larger than the predetermined value, the coefficient of the frequency component is increased. Hence, not all the frequency components are emphasized, but the frequency components judged to include characteristic portions, such as edge components, are increased and emphasized. As a result, unnecessary block patterns are suppressed from being generated in the edge boundary portions of a curve, whereby it is possible to obtain a curve with clear edges. The coefficients of the frequency components are the coefficients of the discrete cosine transform (DCT), for example.

The coefficients of frequency components other than both the DC component and the specific frequency components excluding the frequency components on the low frequency side and the DC component are increased. Hence, the coefficients of the frequency components described above are increased and emphasizing is carried out, whereby clearer halftone images can be obtained.

In the case that the absolute value of the coefficient of each of the specific frequency components is larger than the predetermined value, a correction coefficient is multiplied to the coefficient of each of the frequency components, the lower the frequency component, the smaller the correction coefficient, and the higher the frequency component, the larger the correction coefficient. Hence, the frequency components are corrected so as to become higher as the frequency components are closer to the high frequency side in the horizontal direction and the vertical direction. As a result, halftone images with clear edges can be obtained even when curves or the like are reproduced.

In the case that the absolute value of the coefficient of each of the specific frequency components is smaller than the predetermined value, the coefficient of the frequency component is decreased. Hence, among the specific frequency components, the coefficients of the frequency components not including characteristic components, such as edge components, are decreased, and smoothing is carried out, whereby smoother halftone images can be obtained.

The image forming apparatus according to the present invention comprises the above-mentioned image processing apparatus, and image forming means for forming images processed using the image processing apparatus on sheets.

The computer program according to the present invention is a computer program by which image data is transformed to spatial frequencies to obtain multiple frequency components, the obtained frequency components are processed, the processed frequency components are inversely transformed to image data, and the number of gray levels of the inversely transformed image data is decreased using a computer, and the computer program comprises the step of causing a computer to compare the absolute value of each of specific multiple frequency components in the multiple frequency components obtained after transformation to spatial frequencies with a predetermined value in terms of magnitude, the step of causing a computer to change each of specific frequency components on the basis of the result of the comparison, the step of causing a computer to add a specific value to each of the specific frequency components having been changed and other frequency components, and the step of causing a computer to inversely transform the frequency components, to which the specific values have been added, to image data.

The above and further objects and features of the invention will more fully be apparent from the following detailed description with accompanying drawings.

BRIEF DESCRIPTION OF THE SEVERAL VIEWS OF THE DRAWINGS

FIG. 1 is a view showing an example of a dither matrix;

FIG. 6 is a view showing an example of a blue noise mask;

FIG. 7 is a view showing an example of the noise DCT coefficients obtained by subjecting the blue noise mask to the discrete cosine transform;

DETAILED DESCRIPTION OF THE INVENTION

The present invention will be described below specifically on the basis of the drawings showing the embodiments thereof.

Embodiment 1

Figure 2:
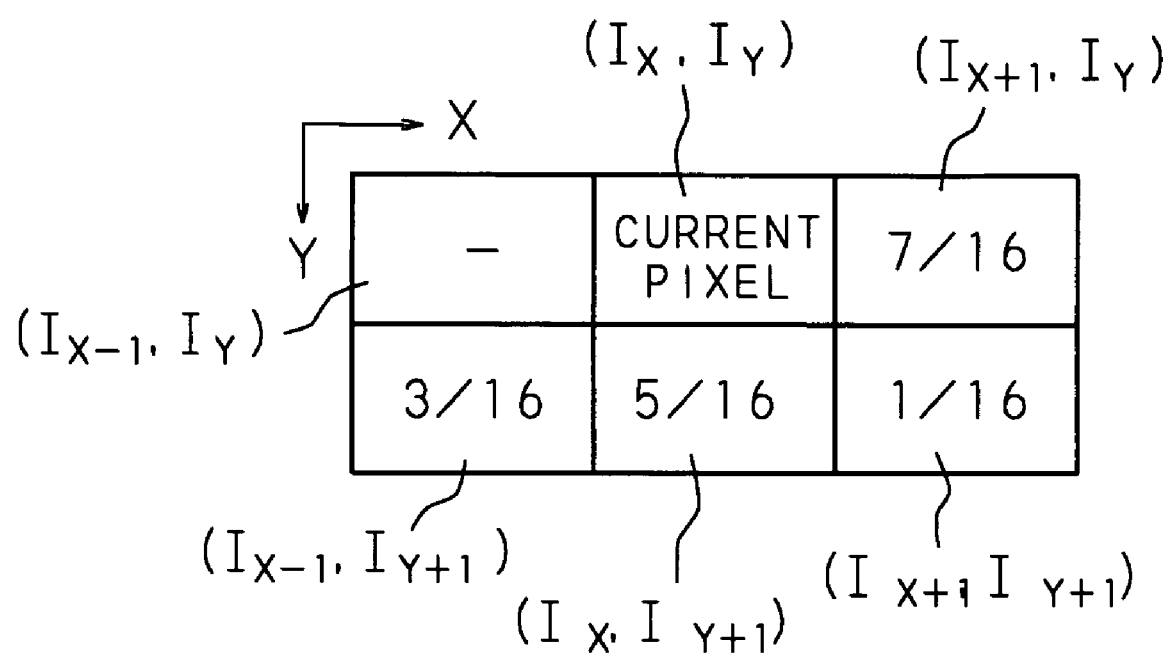
FIG. 2 is a view showing an example of a weighing coefficient matrix being used for the error diffusion method.
Figure 3:
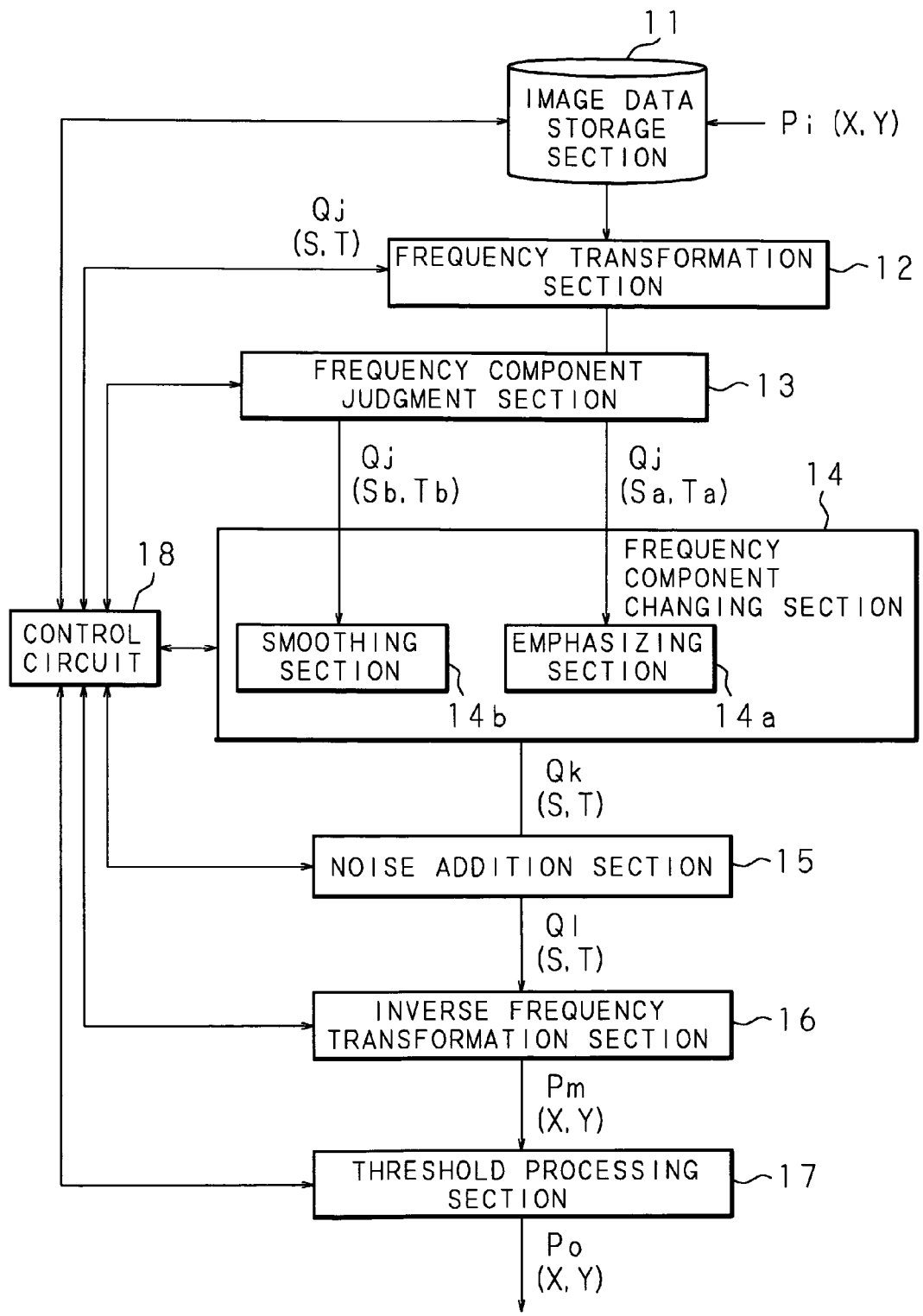
FIG. 3 is a block diagram showing a configuration example of a halftone generating apparatus according to the present invention.

FIG. 3 is a block diagram showing a configuration example of a halftone generating apparatus (image processing apparatus) according to the present invention. The halftone generating apparatus is an apparatus that generates and outputs image data Po (X, Y) obtained by decreasing the number of gray levels of input image data Pi (X, Y). For example, the apparatus generates and outputs image data Po (X, Y) obtained by decreasing the number of gray levels of the Pi (X, Y), from 256 to 4. The image data Pi (X, Y) herein represents the gray level values of an image formed of pixels disposed in a two-dimensional matrix in the X-direction and the Y-direction being perpendicular to each other, that is, on the horizontal line and the vertical line. X designates the position of the image on the horizontal line, and Y designates the position of the image on the vertical line.

The halftone generating apparatus comprises an image data storage section 11 that stores the input image data Pi (X, Y), a frequency transformation section 12 that transforms the image data Pi (X, Y) read from the image data storage section 11 to frequency components Qj (S, T) (the coefficients of frequency components, hereafter simply referred to as frequency components), a frequency component judgment section (comparing means) 13 that judges whether the coefficient of each frequency component is larger than a predetermined value), a frequency component changing section (changing means) 14 that changes frequency components according to the result of the judgment made by the frequency component judgment section 13, a noise addition section (adding means) 15 that adds noise to changed frequency components Qk (S, T), an inverse frequency transformation section 16 that carries out inverse frequency transformation for frequency components Ql (S, T) to which noise is added, a threshold processing section 17 that carries out threshold processing for image data Pm (X, Y) having been subjected to inverse frequency transformation, and a control section 18, such as a computer, that controls these sections. The halftone generating apparatus outputs image data Po (X, Y) from the threshold processing section 17. In addition, the frequency component changing section 14 has an emphasizing section 14a that changes the specific frequency components Qj (Sa, Ta) of the frequency components Qj (S, T) by carrying out emphasizing, and a smoothing section 14b that changes other frequency components Qj (Sb, Tb) by carrying out smoothing.

By the control of the control section 18, the image data Pi (X, Y) stored in the image data storage section 11 is outputted sequentially to the frequency transformation section 12, a group (block) of 8×8 pixels being used as a unit, and the image data is transformed to spatial frequencies. In this description, the discrete cosine transform (DCT) is taken as an example of the transformation to spatial frequencies. When it is assumed that an input image is $A_{ij}$, an output image is $B_{ij}$, and the sizes of the row and column of the input image A are M and N, the discrete cosine transform is carried out on the basis of the following formula.

$$B_{pq} = \alpha_p \alpha_q \sum_{m=0}^{M-1} \sum_{n=0}^{N-1} A_{mn} \cos \frac{\pi(2m+1)p}{2M} \cos \frac{\pi(2n+1)q}{2N} \begin{pmatrix} 0 \le p \le M-1 \\ 0 \le q \le N-1 \end{pmatrix} \quad \text{(formula 1)}$$

$$\alpha_p = \begin{cases} 1\sqrt{M} & (p=0) \\ \sqrt{2/M} & (1 \le p \le M-1) \end{cases}$$

$$\alpha_p = \begin{cases} 1\sqrt{N} & (q=0) \\ \sqrt{2/N} & (1 \le q \le N-1) \end{cases}$$

The frequency transformation section 12 carries out the discrete cosine transform for a two-dimensional image, an object to be image-processed, beginning with the unit block including the most upper left pixel, block by block, in the X-direction, and ending with the unit block including the most lower right pixel, while the lines are shifted sequentially in the Y-direction. Although four colors, CMYK, are used in actual processing, because similar processing is carried out for the respective colors, processing for a single color is described below. The frequency transformation section 12 receives the image data Pi (X, Y) in which a unit block is formed of 8×8 pixels, carries out the discrete cosine transform for the image data Pi (X, Y) and outputs frequency components (the coefficients of frequency components, hereafter referred to as DCT coefficients) Qj (S, T), having been subjected to the discrete cosine transform, to the frequency component judgment section 13.

Figure 4A:
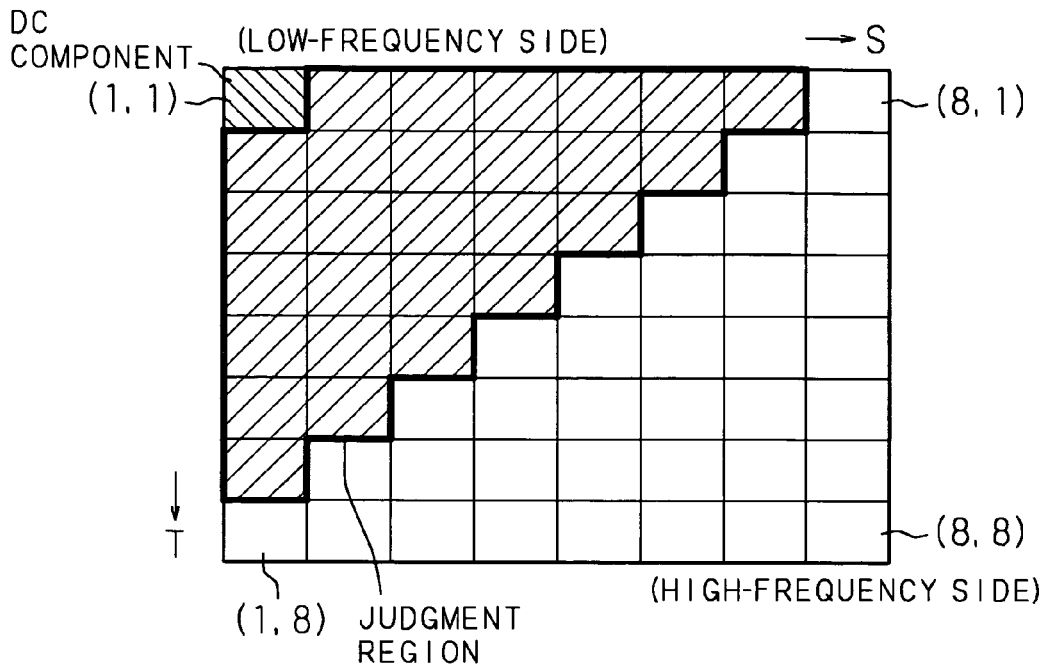
FIG. 4A is a schematic view showing an example of a region in which the magnitudes of DCT coefficients in a block are judged.

The frequency component judgment section 13 judges whether a specific DCT coefficient is larger than a predetermined value. More specifically, the frequency component judgment section 13 judges the DCT-processed DCT coefficients in a block of 8×8 pixels whether the magnitude (absolute value) of each of specific AC components (alternating current components) other than a DC component (direct current component) is larger than the predetermined value. FIG. 4A is a schematic view showing an example of a region in which the magnitudes of the DCT coefficients in a block are judged. One block includes 8×8 DCT coefficients. The upper left of the block is used as the origin, and the right direction therefrom is assumed to be the S-axis, and the downward direction therefrom is assumed to be the T-axis. For example, the upper left corner of the block is Qj (1, 1), and the lower right corner is Qj (8, 8). The upper left Qj (1, 1) is a DC component, and the others are AC components. In addition, the upper left side of the block is a low-frequency region, and the lower right side of the block is a high-frequency region. Furthermore, the first row corresponds to frequency components relating to the image data only in the horizontal direction, and the first column corresponds to frequency components relating to the image data only in the vertical direction. In the example shown in the figure, the region including Qj (2, 1) to Qj (7, 1), Qj (1, 2) to Qj (6, 2), Qj (1, 3) to Qj (5, 3), Qj (1, 4) to Qj (4, 4), Qj (1, 5) to Qj (3, 5), Qj (1, 6) to Qj (2, 6), and Qj (1, 7) is set as a region in which judgments are made (the region of the specific frequency components, hereafter referred to as a judgment region).

The frequency component judgment section 13 obtains the absolute value (|Qj (S, T)|) of a DCT coefficient included in the judgment region, among the DCT coefficients Qj (S, T) in the block, and judges whether the obtained absolute value is larger than the predetermined value ($\alpha$>0). If the absolute value is larger than the predetermined value, it is judged that an edge is included, and emphasizing is carried out. If the absolute value is equal to or less than the predetermined value, it is judged that no edge is included, and smoothing is carried out.

If |Qj (S, T)|>$\alpha$, emphasizing is carried out.

If |Qj (S, T)|$\leq$$\alpha$, smoothing is carried out.

In other words, the judgment as to whether emphasizing or smoothing is carried out is made not by block unit but by DCT coefficient unit in the block. Herein, the predetermined value $\alpha$ can be set as desired. If $\alpha$ is small, it is easy to judge that an edge is included. If $\alpha$ is large, it is difficult to judge that an edge is included. In this embodiment, $\alpha$=16. The method for judging whether the DCT coefficient includes an edge is not limited to the above-mentioned method. For example, it is possible to use a method in which the predetermined value is compared with the absolute value of the value obtained by multiplying the DCT coefficient by the magnitude of the DC component.

Figure 4B:
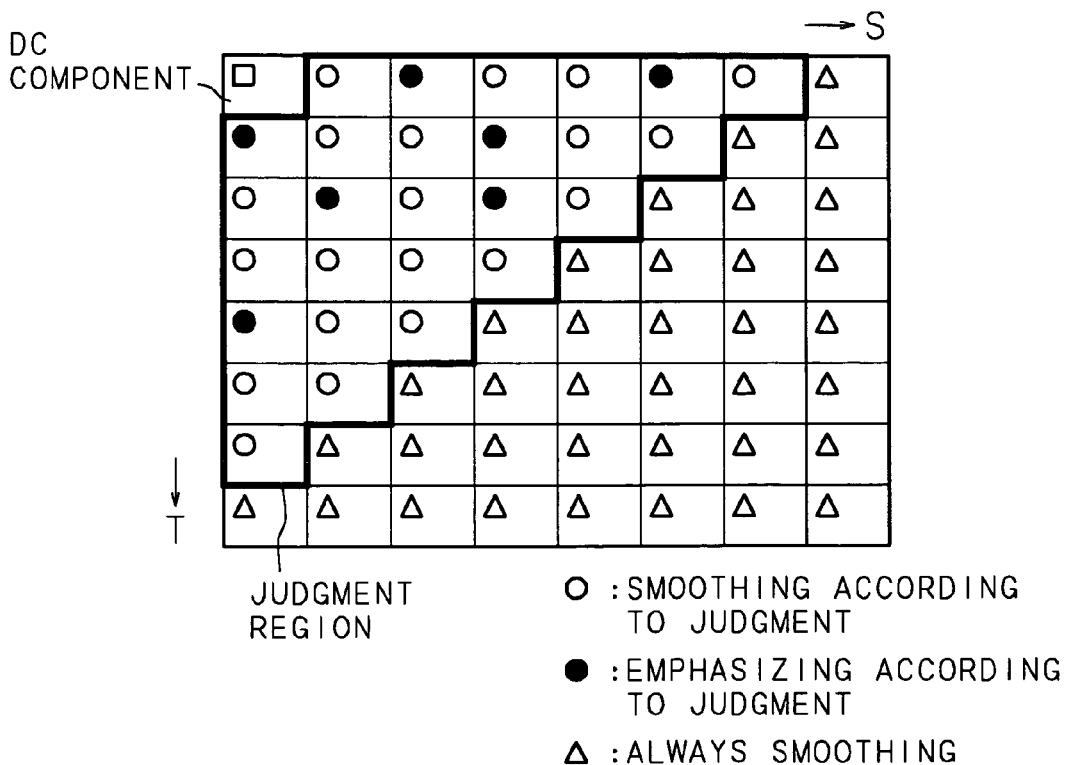
FIG. 4B is a schematic view showing an example of judgment result.

In addition, smoothing is carried out for the DCT coefficients outside the judgment region. FIG. 4B is a schematic view showing an example of judgment result. Smoothing is carried out for the AC components ($\Delta$) outside the judgment region. For some ($\bullet$) of the AC components inside the judgment region, emphasizing is carried out, and for the others ($\bigcirc$), smoothing is carried out, according to the judgment result. In this way, emphasizing and smoothing can be carried out in combination inside the block by switching the processing for each DCT coefficient.

When it is herein assumed that the DCT is carried out under the condition that one block is formed of 8×8 pixels and also assumed that, for a natural image, a higher brightness level is assigned to a pixel having a larger value in each block after the discrete cosine transform, the brightness of the component corresponding to the low-frequency side (the upper left portion of each block) becomes high according to the result obtained after the processing. In other words, the low frequency components have larger amounts of information. It is known that the powers of signals each having a strong relationship between a portion having high density, such as an edge, and a portion having low density are concentrated in the low frequency region in view of frequencies. This means that power concentration occurs in some DCT coefficients and not in others. In other words, the magnitudes of the DCT coefficients are significantly uneven.

Generally, when the discrete cosine transform is carried out for a natural image, the DC component has a particularly large value, and the DCT coefficients of the AC components on the low frequency side become large. Hence, in the case of an image (a natural image) having characteristic amounts, such as edge components or contrasting density levels, the low frequency components near the DC component have large values. However, in the case that the discrete cosine transform is carried out for a solid image (an image having uniform density and not having edge portions), only the DC component has a value, and the low frequency components near the DC component have values close to zero. Hence, on the basis of the values of the low frequency components, it is possible to judge whether an original image has characteristic amounts.

Furthermore, as shown in Formula 1, in the case that the edge components are conspicuous in the main scanning direction (X direction) or in the case that the edge components are conspicuous in the auxiliary scanning direction (Y direction), the value of the AC component positioned on the right adjacent to the DC component or the value of the AC component positioned directly below the DC component becomes large owing to the influence of the edge components. For these reasons, in the case of |Qj (S, T)|>$\alpha$, it is assumed that characteristics, such as edge components, are included in the judgment region.

Moreover, the frequency component judgment section 13 outputs the DCT coefficients to the emphasizing section 14$a$ or the smoothing section 14$b$ according to the judgment result. The frequency component judgment section 13 transmits the DCT coefficients Qj (Sa, Ta) to be subjected to emphasizing, among the AC components of the DCT coefficients Qj (S, T), to the emphasizing section 14$a$ of the frequency component changing section 14, and also transmits the DCT coefficients Qj (Sb, Tb) to be subjected to smoothing to the smoothing section 14$b$ of the frequency component changing section 14. The DCT coefficients Qj (Sa, Ta) to be subjected to emphasizing are DCT coefficients that are judged to be subjected to emphasizing in the judgment region, and the DCT coefficients Qj (Sb, Tb) to be subjected to smoothing are DCT coefficients that are judged to be subjected to smoothing in the judgment region and DCT coefficients outside the judgment region. Still further, although the DC component is transmitted to the frequency component changing section 14, the DC component is not subjected to either emphasizing or smoothing.

The emphasizing section 14$a$ changes the DCT coefficients Qj (Sa, Ta) transmitted from the frequency component judgment section 13 so that emphasizing is carried out. For example, the DCT coefficients Qj (Sa, Ta) can be changed (increased) by multiplying the DCT coefficients by the position data corresponding to the positions (coordinates) in the block and by a predetermined constant.

Figures 5A, 5B:
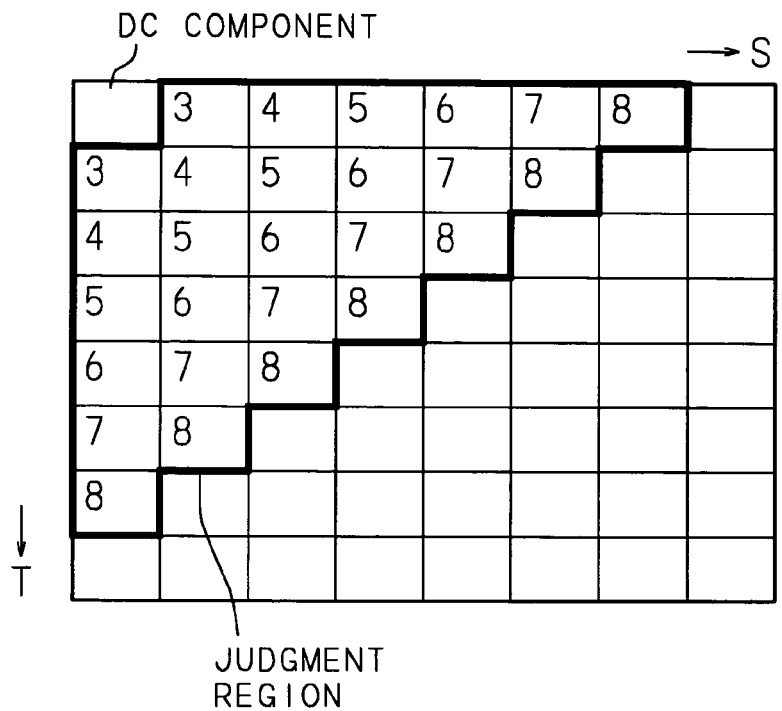
FIG. 5A is a schematic view showing an example of the position data of the DCT coefficients at the respective positions (coordinates) inside the judgment region in a block.
FIG. 5B is a view showing an example of a matrix being used for position data.

DCT coefficients $Qk(S,T)$ after the change=DCT coefficients $Qj(Sa,Ta)$ before the change×position data×constant The position data can be a value (=S+T) obtained by adding the row number S and the column number T of the DCT coefficient Qj (S, T). FIG. 5A is a schematic view showing an example of the position data of the DCT coefficients at the respective positions (coordinates) inside the judgment region in a block. In the case of Qj (2, 1), the position data is 2+1=3. In the case of Qj (1, 2), the position data is 1+2=3.

The constant can be set at 0.35, for example. However, this value (0.35) is an example, and the constant can be a very small value and a value by which emphasizing is carried out.

Furthermore, because the degree of emphasizing changes depending on this value, it is preferable that the value should be determined while the whole balance is considered as to whether edges are emphasized excessively, for example, and while image quality is evaluated using an actual output image or the like. Because the DC component is herein not changed but remains to be Qj (1, 1), the average density of the whole block is maintained. In the case that Qj (1, 3) and Qj (2, 4) are emphasized for example, the following are obtained.

$$Qk(1,3)=Qj(1,3)\times(1+3)\times0.35$$

$$Qk(2,4)=Qj(2,4)\times(2+4)\times0.35$$

As another example in which the level of emphasizing is adjusted, it is possible that an offset value (a constant) is provided for the position data. In this case, it is assumed that the offset value is 3 (a constant value) and that the constant is 0.20, and the following are obtained.

$$Qk(1,3)=Qj(1,3)\times(1+3+\text{offset value})\times0.20$$

$$Qk(2,4)=Qj(2,4)\times(2+4+\text{offset value})\times0.20$$

wherein the offset value=3. The level of emphasizing can be changed accordingly.

The smoothing section 14b changes the DCT coefficients Qj (Sb, Tb) transmitted from the frequency component judgment section 13 so that smoothing is carried out. For example, the DCT coefficients Qj (Sb, Tb) can be changed (decreased) by dividing the DCT coefficients by the position data corresponding to the positions (coordinates) in the block.

$$Qk(S,T)=Qj(Sb,Tb)/\text{position data}$$

As the position data, it is possible to use the two-dimensional matrix M (S, T) (S=1 to 8, T=1 to 8) corresponding to the DCT coefficients Qj (S, T) in the block. FIG. 5B is a view showing an example of the matrix M. The matrix M is an 8×8 matrix corresponding to the 8×8 DCT coefficients. In the matrix M, the position data has the minimum value in M (5, 5) (M (5, 5)>1), and the position data around M (5, 5) increases concentrically.

The matrix M shown in FIG. 5B generally has the characteristics of the contrast sensitive function (CSF), that is, the characteristics reflecting the visual sense characteristics of the human being. The sensitivity of the human being to contrast generally depends on spatial frequencies, and the visual system of the human being is regarded as a kind of band pass filter. For example, in the case of a white-and-black striped pattern, the sensitivity of the human being for the striped pattern changes depending on the distance between stripes arranged continuously.

In the case that the distance between the stripes is very small, it is difficult for the human being to sense the striped pattern. The values of M(S, T) are, for example, values changing concentrically around M (5, 5)=2.1 depending on the sensitivity of the human being to contrast as shown in FIG. 5B. In the case that the DCT coefficients Qj(S, T) are divided by the CSF, the DCT coefficients of frequency components having high sensitivity to contrast are divided by a value larger than that in the case of the DCT coefficients of frequency components having low sensitivity to contrast, whereby a higher smoothing effect is obtained.

With this embodiment, the frequency components in the block to be processed are changed so that the frequency components having edge portions are emphasized, and so that the others are smoothened. Hence, it is possible to obtain an image whose edge portions are emphasized and whose flat image portions not having edge portions are further smoothened in the whole image. Therefore, the characteristic portions of the original image are maintained properly.

The two-dimensional matrix being used for smoothing is not limited to that shown in FIG. 5B. It is preferable to use a two-dimensional matrix wherein small values are set for frequency components being low in the sensitivity of the human being to contrast, and large values are set for frequency components being high in the sensitivity of the human being to contrast. In other words, it is preferable to use a two-dimensional matrix wherein low frequency components are maintained and the DCT coefficients being concentrically external in the 8×8 block are suppressed more significantly. For example, it may be possible to use a two-dimensional matrix having the Gaussian distribution.

The AC components subjected to emphasizing or smoothing and the DC component not processed but remained unchanged are transmitted from the frequency component changing section 14 to the noise addition section 15. The noise addition section 15 adds DCT coefficients having blue noise characteristics (hereafter referred to as noise DCT coefficients) to the DCT coefficients Qk (S, T) received from the frequency component changing section 14.

FIG. 6 is a view showing an example of a blue noise mask. In the figure, blue noise is given as 256×256 matrix data, and this matrix data is referred to as a blue noise mask. The noise addition section 15 stores noise DCT coefficients (specific values) in a memory in advance obtained by subjecting the blue noise mask shown in FIG. 6 to the discrete cosine transform and normalizing it. FIG. 7 is a view showing an example of the noise DCT coefficients obtained by subjecting the blue noise mask to the discrete cosine transform. In this embodiment, the blue noise mask is subjected to the discrete cosine transform for each 8×8 block unit, and the noise DCT coefficients of a 32×32 block are stored in the memory. Furthermore, the noise DCT coefficients in the 32×32 block are sequentially added to the DCT coefficients Qk(S, T) of each block to be inputted sequentially to the noise addition section 15.

Blue noise is herein pattern data having frequency components difficult to be sensed by human eyes. It is known that human eyes cannot sense pattern images having spatial frequencies equal to or more than a certain frequency and that the MTF (modulation transfer function) of the visual system is a kind of low-pass filter ("High-quality Image Technologies in Ink-jet Printers" by MAKITA Tsuyoshi), Journal of the Imaging Society of Japan, 2001, Vol. 40, No. 3, p. 239 to 243). Blue noise is obtained by operating a pseudo-random pattern and by generating a pattern wherein the main components of the spatial frequency are distributed in a band having frequencies equal to or more than the cutoff frequency of the MTF of the visual system.

By the addition of the DCT coefficients based on the blue noise to the DCT coefficients Qk(S, T), pixels are prevented from being connected to one another in highlighted portions having large gray level values, and texture in intermediate density portions can be improved. The DCT coefficients Ql (S, T) to which the noise DCT coefficients are added are outputted from the noise addition section 15 to the inverse frequency transformation section 16. The inverse frequency transformation section 16 subjects the DCT coefficients Ql(S, T), to which the noise DCT coefficients are added, to inverse frequency transformation, thereby generating image data Pm(X, Y), and outputting the generated image data Pm(X, Y) to the threshold processing section 17. The inverse frequency transformation is carried out according to the inverse transformation of Formula 1.

In addition, the threshold processing section 17 transforms the image data Pm(X, Y) positioned in the density region and outputted from the inverse frequency transformation section 16 to image data Po(X, Y) having multiple levels using multiple predetermined values. For example, the gray level values of the image data Pm(X, Y) are compared with the threshold values, and the gray level values of the image data Pm(X, Y) are changed to four values, for example, 0, 85, 171 and 255, according to the result of the comparison. For example, three threshold values, 42, 127 and 212, are compared with Pm (X, Y) as described below.

If $0 < Pm(X, Y) \leqq 42$, then Po (x, Y)=0,
if $42 < Pm(X, Y) \leqq 127$, then Po (X, Y)=85,
if $127 < Pm(X, Y) \leqq 212$, then Po (X, Y)=171, and
if $212 < Pm(X, Y) \leqq 255$, then Po (X, Y)=255.

The image data Pm(X, Y) is thus transformed to image data Po (X, Y) having four values.

The threshold processing section 17 outputs the changed image data Po (X, Y) to the outside. The control section 18 controls the image data storage section 11, the frequency transformation section 12, the frequency component judgment section 13, the frequency component changing section 14 (the emphasizing section 14a and the smoothing section 14b), the noise addition section 15, the inverse frequency transformation section 16, and the threshold processing section 17.

Figure 8A:
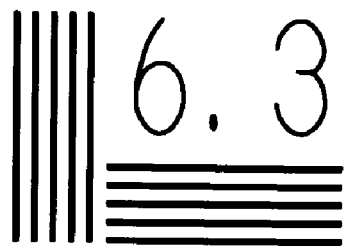
FIG. 8A is a schematic view showing an example of output images in the case that all the DCT coefficients are changed in block unit.
Figure 8A:
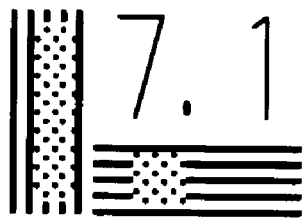
Figure 8A:
Figure 8B:
FIG. 8B is a schematic view showing an example of output images in the case that the DCT coefficients are changed in the unit of DCT coefficient.
Figure 8B:
Figure 8B:
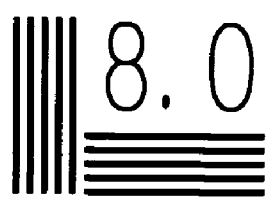

As described above, the judgment as to whether edge emphasizing or smoothing should be carried out is made not by block unit but by the unit of frequency components, and the switching between emphasizing and smoothing is carried out for each DCT coefficient. Hence, it is possible to suppress emphasizing/smoothing judgment errors in block unit, the edge components are emphasized, and the other components are smoothened, whereby image optimization processing is attained. FIG. 8A is a schematic view showing an example of output images in the case that all the DCT coefficients are changed in block unit, and FIG. 8B is a schematic view showing an example of output images in the case that the DCT coefficients are changed in the unit of DCT coefficient. As shown in FIG. 8A, in the case that all the DCT coefficients are changed in block unit, portions damaged in a block shape occur inside the image owing to emphasizing/smoothing judgment errors in block unit. However, as shown in FIG. 8B, in the case that the DCT coefficients are changed in the unit of DCT coefficient, portions damaged in a block shape do not occur.

In addition, because an image including edge components is emphasized, it is possible to obtain a more well-defined image. An image not including edge components is smoothened in consideration of the visual sense characteristics. Furthermore, in emphasizing, all the frequency regions other than the DC component are not emphasized, but the regions to be emphasized are limited, and the coefficient for emphasizing is set so as to become gradually larger as its position is farther from the DC component. Hence, unnecessary block patterns are suppressed from being generated in the edge boundary portions on a curve, whereby it is possible to obtain a curve with clear edges.

Because the DCT coefficients of the AC components have information on the edge components of the image, the edge portions can be emphasized by increasing the values of the DCT coefficients of the AC components so as to be larger than the values of the DCT coefficients of the original image. On the other hand, in the case that no edge component is included in a part of the image, the part of the image is not emphasized. Hence, only the edge portions of the entire image can be emphasized, whereby the number of gray levels can be reduced while the characteristic portions of the original image are maintained properly. A judgment is made as to whether an edge component is included in the unit of frequency component. In the case that an edge portion is included, the frequency component is changed so that the edge is emphasized. Hence, it is possible to obtain an image being sharp at edge portions, and the number of gray levels of the image can be decreased while the characteristic portions of the original image are maintained properly. The processing is particularly effective for images including numerous texts, graphic arts or the like.

In addition, it is possible to improve the pixel dispersibility in the highlighted region of an image subjected to the threshold processing or to improve the texture in the intermediate density region of the processed image by adding the noise DCT coefficients based on the blue noise difficult to be sensed by the human being to the DCT coefficients. Furthermore, because blue noise is difficult to be sensed by the human being, image deterioration owing to the addition of the noise can be minimized. By the addition of the noise DCT coefficients, pixels are prevented from being connected to one another at highlighted portions having large gray level values while image deterioration is minimized.

Embodiments 2

Figure 9:
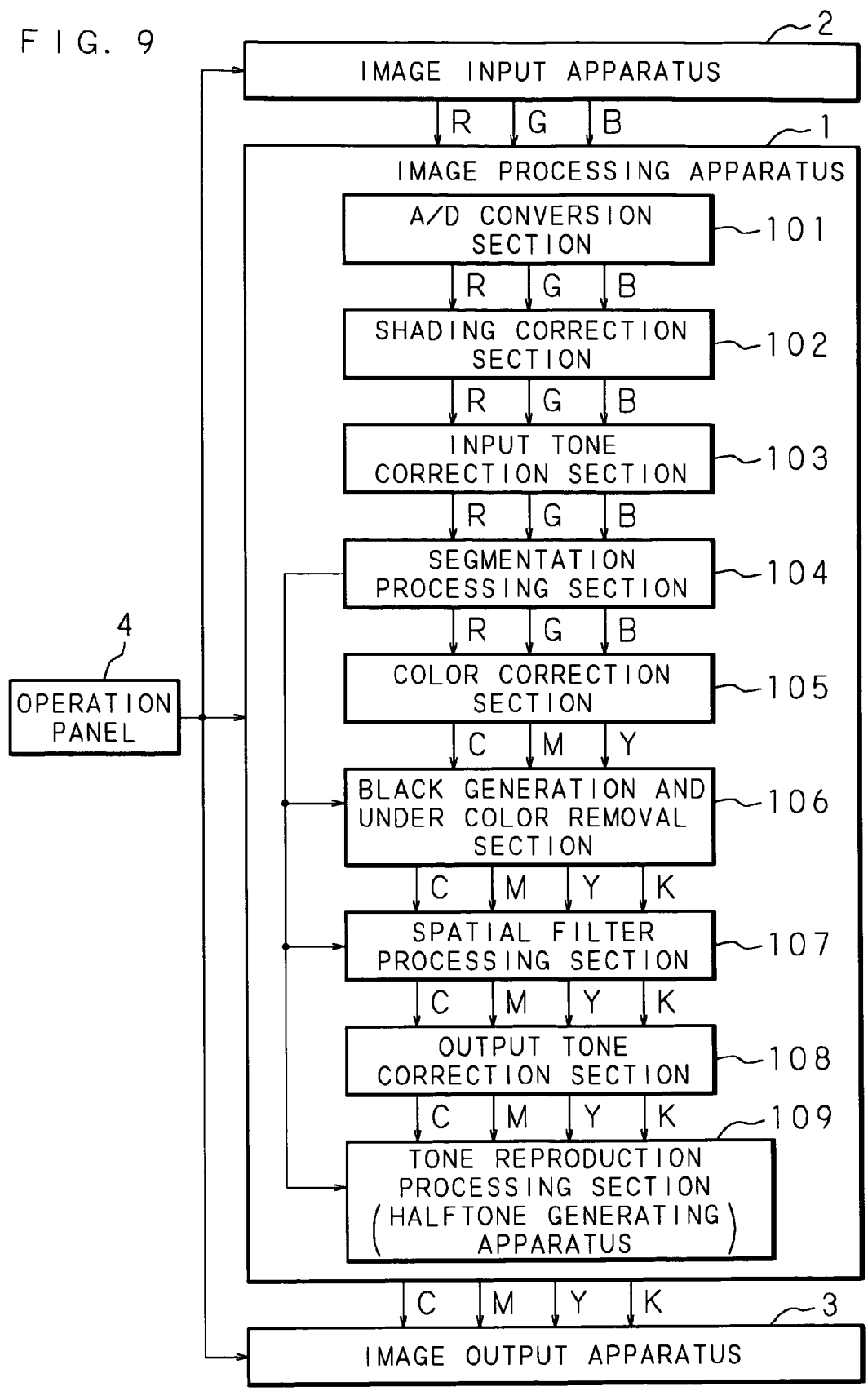
FIG. 9 is a block diagram showing a configuration example of an image forming apparatus provided with an image processing apparatus according to the present invention.

FIG. 9 is a block diagram showing a configuration example of an image forming apparatus provided with the image processing apparatus according to the present invention. In this description, the image forming apparatus operates as a digital color copier. The image forming apparatus comprises an image input apparatus 2 capable of reading color images, an image processing apparatus 1 capable of processing color images, an image output apparatus (image forming means) 3 capable of outputting color images to sheets or the like, and an operation panel 4. Furthermore, the image forming apparatus is provided with a control section (not shown) formed of a CPU (central processing unit) or the like for controlling various devices inside the image forming apparatus.

The image input apparatus 2 is provided with a CCD (charge coupled device), for example. The apparatus reads the image of light reflected from a manuscript using the CCD and generates RGB (R: red, G: green, B: blue) analog signals. The generated RGB analog signals are transmitted to the image processing apparatus 1.

The image processing apparatus 1 comprises an A/D (analog/digital) conversion section 101, a shading correction section 102, an input tone correction section 103, a segmentation processing section 104, a color correction section 105, a black generation and under color removal section 106, a spatial filter processing section 107, an output tone correction section 108, a tone reproduction processing section 109, and a control section (not shown) for controlling the various sections. The tone reproduction processing section 109 operates as the halftone generating apparatus of Embodiment 1.

The image processing apparatus 1 converts the RGB analog signals received from the image input apparatus 2 to RGB digital signals, carries out various image processing, such as correction, generates CMYK (C: cyan, M: magenta, Y: yellow, K: black) digital signals, and decreases the number of gray levels of the generated CMYK digital signals (hereafter referred to as the CMYK signals) to two or four, for example. The output image data, the number of gray levels being decreased to two or four, is temporarily stored in a storage apparatus not shown, and outputted to the image output apparatus 3 at predetermined timing.

The A/D conversion section 101 receives the RGB analog signals from the image input apparatus 2, converts the received RGB analog signals into RGB digital signals, and transmits the RGB digital signals to the shading correction section 102. The shading correction section 102 processes the RGB digital signals received from the A/D conversion section 101 to remove various distortions caused in the illumination system, image focusing system and image sensing system of the image input apparatus 2, and transmits the processed RGB digital signals to the input tone correction section 103. The input tone correction section 103 adjusts the color balance of the RGB digital signals (RGB reflectance signals) received from the shading correction section 102, converts the signals into density signals that are easily processable using the image processing system adopted in the image processing apparatus 1, and transmits the converted signals to the segmentation processing section 104.

The segmentation processing section 104 segments each pixel of the image formed of the RGB digital signals received from the input tone correction section 103 to one of a text region, a halftone dot region and a photo (continuous tone) region, and outputs a segmentation class signal indicating which region each pixel belongs to, on the basis of the result of the segmentation, to the black generation and under color removal section 106, the spatial filter processing section 107 and the tone reproduction processing section 109. Furthermore, the RGB digital signals received from the input tone correction section 103 are transmitted to the color correction section 105 without any change.

To faithfully carry out color reproduction, the color correction section 105 converts the RGB digital signals transmitted from the input tone correction section 103 to CMY digital signals (hereafter referred to as the CMY signals), removes color impurity on the basis of the spectroscopic characteristics of the CMY color materials including useless absorption components, and then transmits the processed CMY signals to the black generation and under color removal section 106. The black generation and under color removal section 106 carries out black generation for generating a black signal (K signal) from the three-color signals, that is, the CMY signals (C signal, M signal and Y signal), received from the color correction section 105. Furthermore, the black generation and under color removal section 106 generates new CMY signals by subtracting the K signal obtained by the black generation from the original CMY signals, and transmits CMYK four-color signals (CMYK signals) to the spatial filter processing section 107.

A method for carrying out black generation using skeleton black is known as general-purpose black generation processing. In this method, when it is assumed that the input/output characteristics of a skeleton curve is $y=f(x)$, that the data to be inputted are C, M and Y, that the data items to be outputted are C', M', Y' and K', and that the UCR (under color removal) ratio is $\alpha(0<\alpha<1)$, K', C', M' and Y' are represented as follows respectively.

K'=f{min(C, M, Y)}
C'=C−αK'
M'=M−αK'
Y'=Y−αK'

The spatial filter processing section 107 processes the image formed of the CMYK signals received from the black generation and under color removal section 106 to make improvements by reducing image blurring or graininess deterioration. The output gray level correction section 108 converts the CMYK signals processed using the spatial filter processing section 107 into a halftone dot area ratio serving as a characteristic value of the image output apparatus 3.

For the image data formed of the CMYK signals, the tone reproduction processing section 109 carries out halftone processing (processing for reducing the number of gray levels to two, four or the like) using error diffusion or dither processing on the basis of segmentation class signal. As the halftone processing, the halftone processing described in Embodiment 1 is carried out. The CMYK signals (image data) subjected to binarization or multi-level processing using the tone reproduction processing section 109 are transmitted to the image output apparatus 3. The image output apparatus 3 forms an image on a recording medium, such as paper, on the basis of the CMYK digital signals received from the image processing apparatus 1. The image output apparatus 3 can be formed of an electrophotographic or ink-jet color image output apparatus, for example.

The operation panel 4 is an operation apparatus through which the user inputs instructions by key operation or the like. The instructions of the user are outputted as control signals from the operation panel 4 to the image input apparatus 2, the image processing apparatus 1 and the image output apparatus 3. When the instructions of the user are input, the image of a manuscript is read using the image input apparatus 2, the image data having been read is processed using the image processing apparatus 1, an image is formed on a sheet from the processed image data using the image output apparatus 3. The image forming apparatus can be operated as a digital color copier. The above-mentioned processing is controlled using the control section (CPU), not shown.

Embodiment 3

Figure 10:
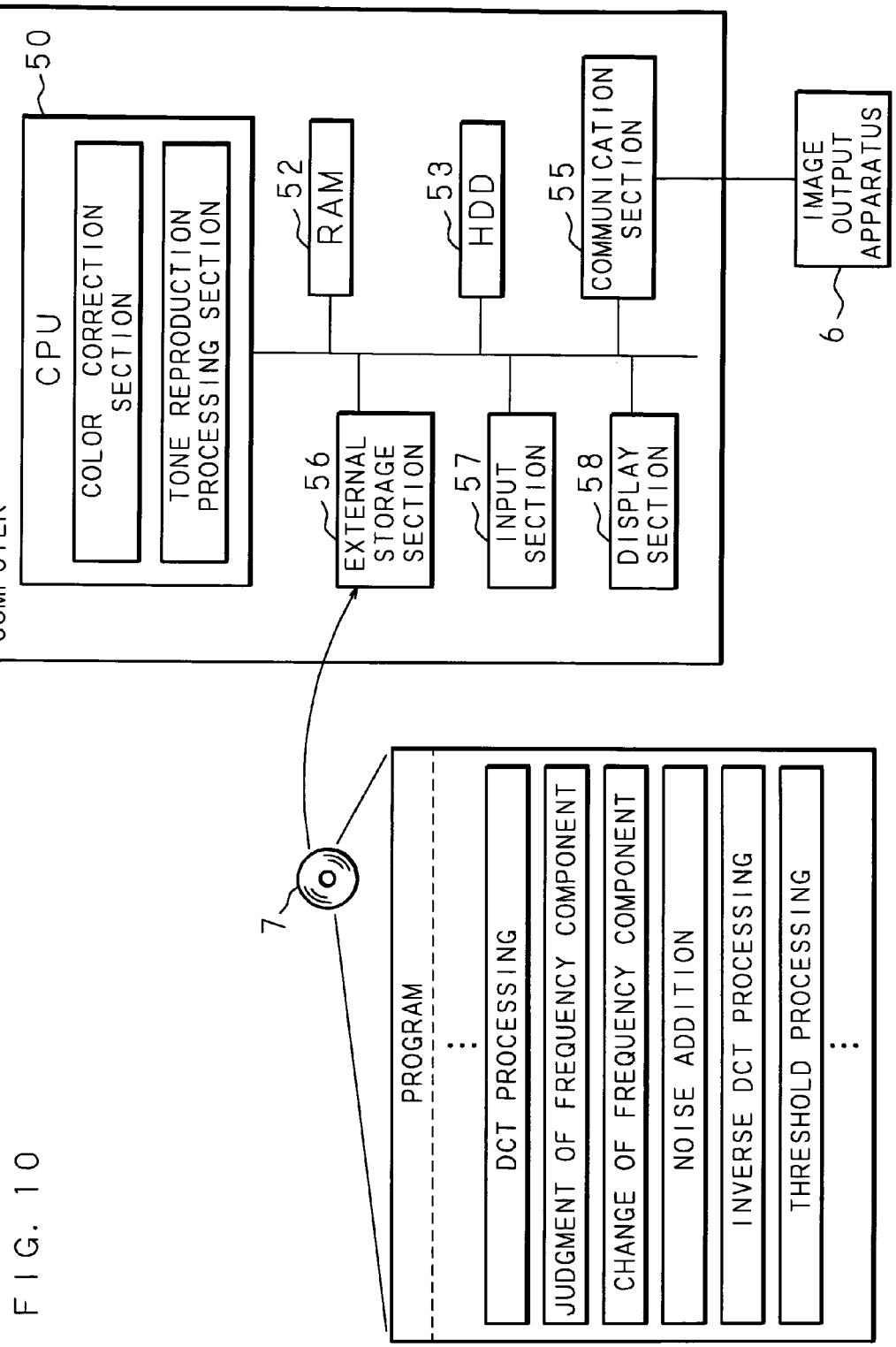
FIG. 10 is a block diagram showing a configuration example of an image forming system according to the present invention.

FIG. 10 is a block diagram showing a configuration example of an image forming system according to the present invention. This image forming system comprises a computer 5 and an image output apparatus 6 connected to the computer 5. The computer 5 comprises a CPU 50, a RAM 52, a HDD (hard disk drive) 53, a communication section 55, an external storage section 56, an input section 57, and a display section 58. The image output apparatus 6 is an apparatus capable of outputting images on sheets, such as an ink-jet printer or a laser printer, and similar to the image output apparatus 3 according to Embodiment 2 (FIG. 9), for example.

The external storage section 56 is an apparatus capable of reading data from a recording medium 7, such as a flexible disk drive or a CD-ROM drive. The display section 58 is an apparatus capable of displaying images, such as a CRT (cathode ray tube) display, a liquid crystal display or the like. The input section 57 is an apparatus capable of receiving operation inputs through a keyboard, a mouse or the like, or capable of receiving image data from an image scanner, a digital camera or the like, not shown. The communication section 55 is a facsimile modem or a LAN (local area network) card, and an apparatus capable of communicating with an external network or the image output apparatus 6.

The CPU 50 controls the above-mentioned sections 52 to 58 inside the computer 5. Besides, the CPU 50 stores programs or data received from the input section 57 or the communication section 55, or programs or data read from the HDD 53 or the external storage section 56 in the RAM 52, carries out various processing, such as the execution of the programs stored in the RAM 52 or the computation of the data stored in the RAM 52, and stores the results of the various processing or temporary data used for the various processing in the RAM 52. The data, such as the computation results, stored in the RAM 52 is stored in the HDD 53, or outputted from the display section 58, the image output apparatus 6, or the communication section 55 under the control of the CPU 50.

The CPU 50 of the computer 5 operates as the color correction section 105 and the tone reproduction processing section 109 of the image processing apparatus 1 according to Embodiment 2 (FIG. 9) (as the halftone generating apparatus according to Embodiment 1 (FIG. 3), comprising the frequency transformation section 12, the frequency component judgment section 13, the frequency component changing section 14, the noise addition section 15, the inverse frequency transformation section 16, and the threshold processing section 17). The CPU 50 can also be operated as any desired section of the image processing apparatus 1 according to Embodiment 2. In addition, the HDD 53 operates as the image data storage section 11 of the halftone generating apparatus according to Embodiment 1. Furthermore, the predetermined value α being compared with various frequency components and various kinds of data, such as noise DCT coefficients based on blue noise, are stored in the HDD 53. Image data read using an image input apparatus, such as an image scanner, is stored in the HDD 53. The CPU 50 carries out processing similar to the processing carried out using the color correction section 105 and the tone reproduction processing section 109 described in Embodiment 2. The processed image data can thus be outputted to the image output apparatus 6.

The computer 5 can be operated as the above-mentioned sections by reading the computer programs recorded in a recording medium 7, such as a CD-ROM, using the external storage section 56, by storing the computer programs in the HDD 53 or the RAM 52, and by executing the programs using the CPU 50. It is also possible to receive the computer programs from another apparatus via the communication section 55 connected to a LAN or the like and to store the computer programs in the HDD 53 or the RAM 52. The computer programs for changing the frequency components according to the present invention may be included in a printer driver or application software for image processing.

The recording medium 7 in which the programs according to the present invention are recorded can be provided so as to be portable by recording the programs for changing the frequency components according to the present invention in the computer-readable recording medium 7.

Figure 11A:
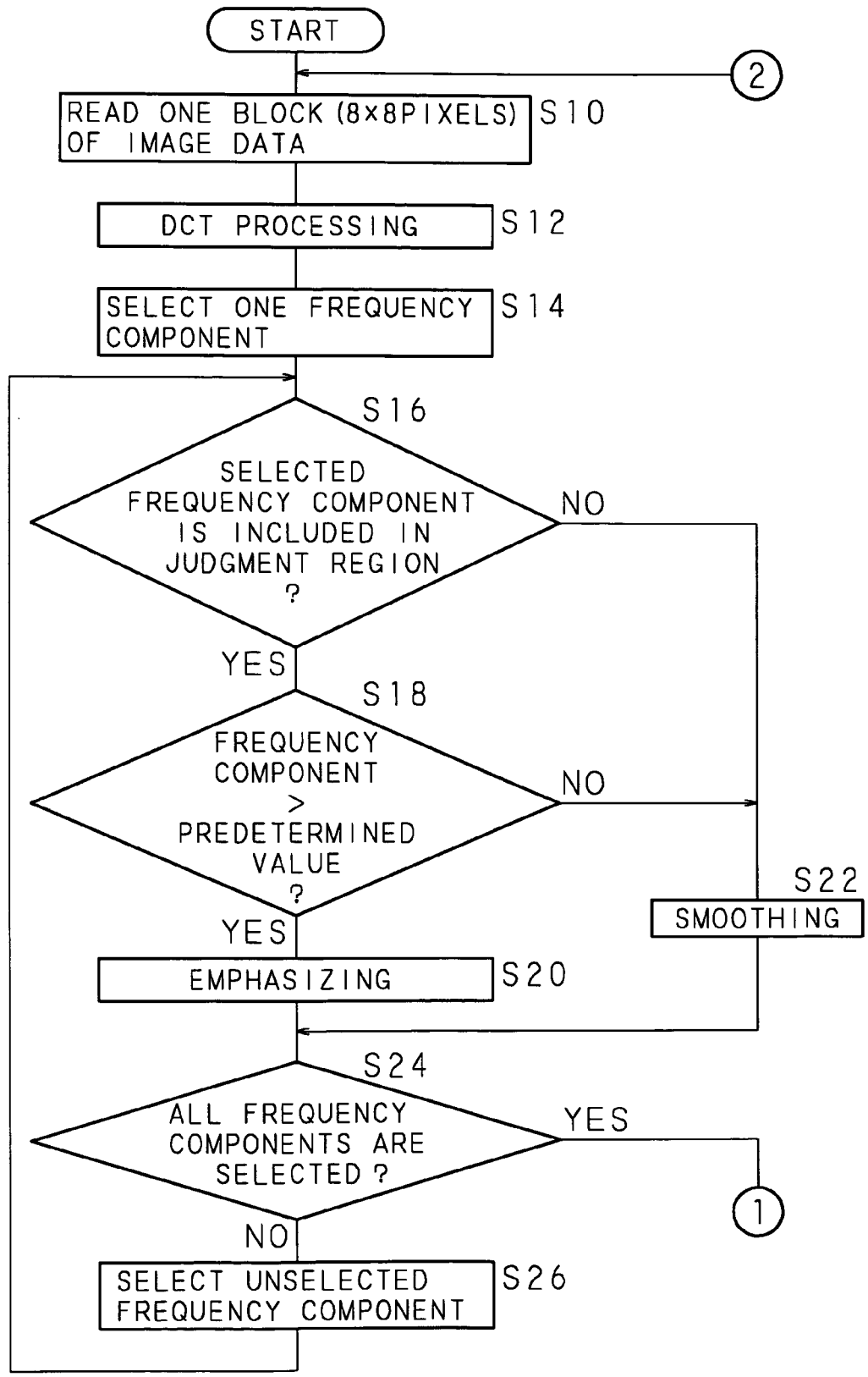
FIGS. 11A and 11B are a flowchart showing a procedure for operating a computer as a halftone generating apparatus (tone reproduction processing section)
Figure 11B:
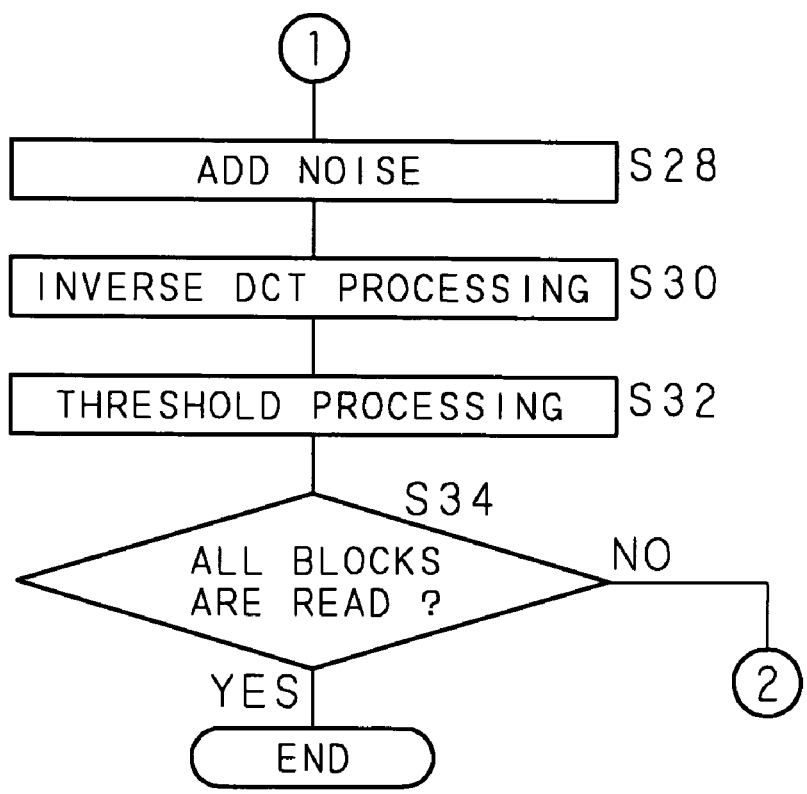

FIGS. 11A and 11B are a flowchart showing a procedure for operating the computer 5 as a halftone generating apparatus (tone reproduction processing section). This procedure is described, assuming that frequency transformation is carried out using the discrete cosine transform, that frequency components (DCT coefficients) are changed, and that image data having four gray levels is outputted by the threshold processing after the inverse frequency transformation. Although four colors, CMYK, are used in actual processing, because similar processing is carried out for the respective colors, processing for a single color is described.

The CPU 50 reads one block (8×8 pixels) of image data from the HDD 53 to the RAM 52 (at step S10), carries out DCT processing (at step S12), and stores transformed frequency components (DCT coefficients) in the RAM 52. The CPU 50 selects one frequency component (at step S14), and judges whether the frequency component is included in the judgment region. In the case that the CPU 50 judges that the frequency component is not included in the judgment region (NO at step S16), the CPU 50 carries out smoothing (at step S22), and stores the processed frequency component in the RAM 52. By the smoothing, the frequency component is changed (decreased) as in the case of Embodiment 1. In the case that the CPU 50 judges that the frequency component is included in the judgment region (YES at step S16), the CPU 50 compares the frequency component with a predetermined value (for example, α=16), and judges whether an edge portion is included. In the case that the frequency component is equal to or less than the predetermined value (NO at step S18), the CPU 50 carries out smoothing (at step S22), and stores the processed frequency component in the RAM 52. In the case that the frequency component is larger than the predetermined value (YES at step S18), the CPU 50 carries out emphasizing (at step S20), and stores the processed frequency component in the RAM 52. By the emphasizing, the frequency component is changed (increased) as in the case of Embodiment 1.

In the case that the selection of all the frequency components in one block is not completed (NO at step S24), the CPU 50 selects an unselected frequency component in the block (at step S26), and carries out similar processing (at steps S16 to S24). In the case that the selection of all the frequency components in the block is completed (YES at step S24), the CPU 50 adds noise (noise DCT coefficients) to all the frequency components (at step S28), and stores the results in the RAM 52. Furthermore, the CPU 50 carries out inverse DCT processing for the frequency components obtained after the addition (at step S30), and stores the results in the RAM 52. The CPU 50 carries out threshold processing for the transformed image data (at step S32), and stores the results in the RAM 52. In the case that the reading of all the blocks is not completed (NO at step S34), the CPU 50 reads one block of image data to the RAM 52 (at step S10), and carries out similar processing (at steps S12 to S32). In the case that the reading of all the blocks is completed (YES at step S34), the procedure ends.

In this embodiment, the recording medium 7 may be a memory, not shown, such as a ROM, itself serving as a program medium so as to be processed using a microcomputer, or a program medium that is inserted in a program reading device as an external storage section so that programs can be read therefrom. In either case, it may be possible to use a configuration in which the stored programs are accessed and executed using the microprocessor, or in either case, it may be possible to use a system in which the programs are read, the read programs are downloaded to the program storage area (not shown) of the microcomputer, and the programs are executed. It is assumed that the programs to be downloaded are stored in the main apparatus in advance.

The above-mentioned program medium is a recording medium configured so as to be removable from the main apparatus. The program medium may be a medium capable of holding programs so as to be nonvolatile, for example, a tape, such as a magnetic tape or a cassette tape; a disk including a magnetic disk, such as a flexible disk or a hard disk, or an optical disc, such as a CD-ROM, MO, MD or DVD disc; a card, such as an IC card (including a memory card) or an optical card; or a semiconductor memory, such as a mask ROM, an EPROM (erasable programmable read only memory), an EEPROM (electrically erasable programmable read only memory) or a flash ROM.

Furthermore, because this embodiment has a system configuration connectable to a communication network including the Internet, the medium may be a medium capable of holding programs as necessary so that the programs can be downloaded via the communication network. In the case that the programs are downloaded via the communication network as described above, the programs to be downloaded may be stored in the main apparatus in advance or may be installed from another recording medium.

Embodiment 4

Figure 12A:
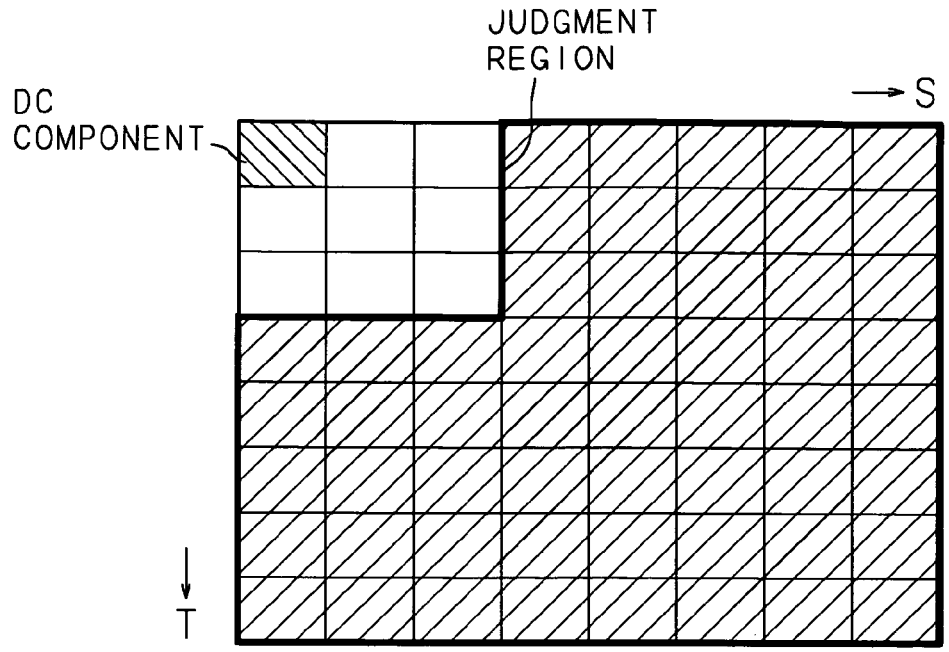
FIG. 12A is a schematic view showing another example of the judgment region.
Figure 12B:
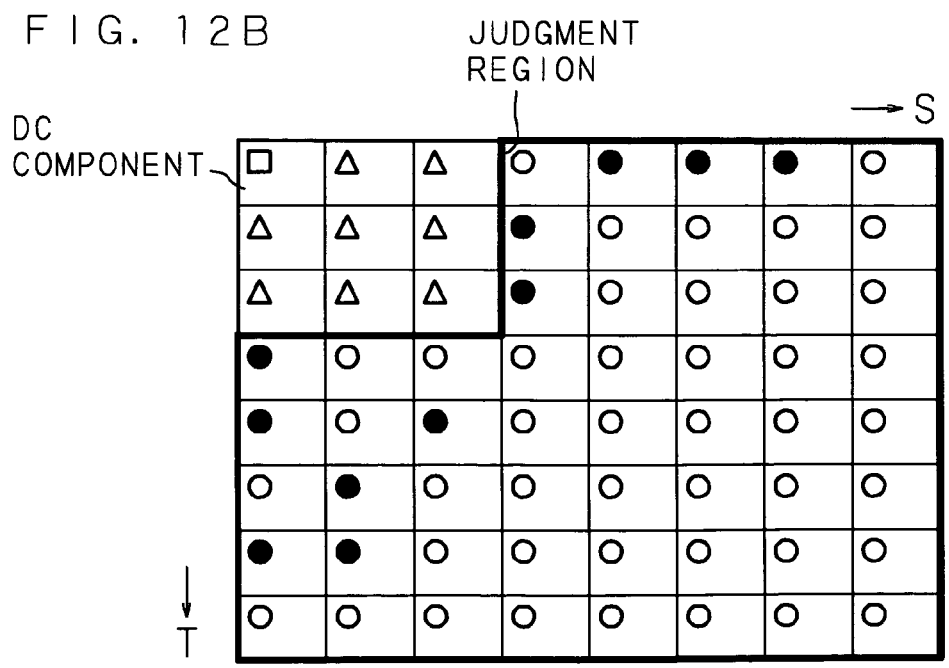
FIG. 12B is a schematic view showing another example of judgment result.

The judgment region in a block, in which frequency transformation is carried out, is not limited to the example shown in FIG. 4A, but can be set as desired. FIG. 12A is a schematic view showing another example of the judgment region. In the example shown in the figure, the region including Qj (4, 1) to Qj (8, 1), Qj (4, 2) to Qj (8, 2), Qj (4, 3) to Qj (8, 3) and Qj (1, 4) to Qj (8, 8) is set as a judgment region (the region of specific frequency components). The AC components in the judgment region are subjected to emphasizing or smoothing according to the result of judgment. However, the AC components outside the judgment region are subjected to emphasizing. FIG. 12B is a schematic view showing an example of judgment result. Emphasizing is carried out for the AC components (Δ) outside the judgment region. For some (●) of the AC components inside the judgment region, emphasizing is carried out, and for the others (○), smoothing is carried out, according to the judgment result. In the above-mentioned Embodiment 1, 2 or 3, it is also possible to change frequency components in the judgment region shown in FIG. 12A. At that time, the comparison between each frequency component (DCT coefficient) and the predetermined value α (α=32 in the example shown in FIG. 12A) and emphasizing/smoothing can be carried out similarly as in the case of Embodiment 1.

In the example shown in FIG. 4A, the region including the frequency components on the low frequency side and the high frequency components in the horizontal and vertical directions is set as the judgment region, and emphasizing or smoothing is carried out according to the judgment result, and smoothing is carried out in the region other than the judgment region. Hence, the dot dispersibility is excellent, and this feature is suited for photo images and the like. On the other hand, in the example shown in FIG. 12A, the region excluding the components on the low frequency side is set as the judgment region, and the components on the low frequency side are emphasized, and the components in the judgment region are emphasized or smoothened according to the judgment result. Hence, oblique lines and the like are made clear, and this feature is suited for text images.

Embodiment 5

The two kinds of judgment regions shown in FIGS. 4A and 12A and emphasizing or smoothing corresponding to the judgment regions can be switched depending on the characteristics of an image. For example, in the image forming apparatus shown in FIG. 9, the operation panel 4 receives and identifies the type of manuscript, text manuscript or photo manuscript. In the case of a photo manuscript, a control section (not shown) can carry out control so that the judgment region shown in FIG. 4A is set and so that emphasizing or smoothing corresponding to the judgment region is carried out. In the case of a text manuscript, the control section can carry out control so that the judgment region shown in FIG. 12A is set and so that emphasizing or smoothing corresponding to the judgment region is carried out. Furthermore, for example, the result of region discrimination, text region or photo region, is transmitted from the segmentation processing section 104 to the tone reproduction processing section 109 of the image processing apparatus shown in FIG. 9. With the use of this feature, the tone reproduction processing section 109 can be configured so that, in the case of a photo region, the judgment region shown in FIG. 4A is set, and emphasizing or smoothing corresponding to the judgment region is carried out, and so that, in the case of a text region, the judgment region shown in FIG. 12A is set, and emphasizing or smoothing corresponding to the judgment region is carried out.

Moreover, switching can be carried out between emphasizing/smoothing corresponding to the judgment region shown in FIG. 4A and emphasizing/smoothing corresponding to the judgment region shown in FIG. 12A by operating the CPU 50 of the computer 5 shown in FIG. 10 as the tone reproduction processing section 109 and by operating the input section 57 as the operation panel 4 or by operating the CPU 50 as the segmentation processing section 104.

In the case of a text manuscript or a text region, emphasizing or smoothing corresponding to the judgment region shown in FIG. 12A and suited for text images is carried out. In the case of a photo manuscript or a photo region, emphasizing or smoothing corresponding to the judgment region shown in FIG. 4A and suited for photo images is carried out. Hence, image optimization processing is attained better.

Still further, although the frequency components outside the judgment region are smoothened (see FIG. 4B) or emphasized (see FIG. 12B) in the respective embodiments described above, it is possible that the frequency components outside the judgment region are not processed or changed. Moreover, it is possible that any desired region of AC components is set as the judgment region. For example, it is possible that the whole region of AC components is set as the judgment region.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An image processing method in which image data is transformed to spatial frequencies to obtain multiple frequency components, the obtained frequency components are processed, the processed frequency components are inversely transformed to image data, and the number of gray levels of the inversely transformed image data is decreased, comprising the steps of:
   comparing the absolute value of each of specific multiple frequency components in the multiple frequency components obtained after transformation to spatial frequencies with a predetermined value in terms of magnitude;
   changing each of said specific frequency components on the basis of the result of the comparison;
   adding a specific value to each of said specific frequency components having been changed and other frequency components; and
   inversely transforming the frequency components, to which the specific values have been added, to image data, wherein
   said specific frequency components in all frequency components are the frequency components on the low frequency side and the frequency components on the high frequency side only in the horizontal direction and the frequency components on the high frequency side only in the vertical direction of image data,
   in the case that the absolute value of the coefficient of each of said specific frequency components is larger than said predetermined value, the coefficient of said frequency component is increased.

2. The image processing method according to claim 1, wherein the coefficients of frequency components other than both said specific frequency components and the DC component are decreased.

3. The image processing method according to claim 1, wherein
in the case that the absolute value of the coefficient of each of said specific frequency components is larger than said predetermined value, a correction coefficient is multiplied to the coefficient of each of said frequency components, the lower the frequency component, the smaller the correction coefficient, and the higher the frequency component, the larger the correction coefficient.

4. The image processing method according to claim 1, wherein
in the case that the absolute value of the coefficient of each of said specific frequency components is smaller than said predetermined value, the coefficient of said frequency component is decreased.

5. An image processing method in which image data is transformed to spatial frequencies to obtain multiple frequency components, the obtained frequency components are processed, the processed frequency components are inversely transformed to image data, and the number of gray levels of the inversely transformed image data is decreased, comprising the steps of:
comparing the absolute value of each of specific multiple frequency components in the multiple frequency components obtained after transformation to spatial frequencies with a predetermined value in terms of magnitude;
changing each of said specific frequency components on the basis of the result of the comparison;
adding a specific value to each of said specific frequency components having been changed and other frequency components; and
inversely transforming the frequency components, to which the specific values have been added, to image data, wherein
said specific frequency components in all frequency components are frequency components excluding both the frequency components on the low frequency side and the DC component,
in the case that the absolute value of the coefficient of each of said specific frequency components is larger than said predetermined value, the coefficient of said frequency component is increased.

6. The image processing method according to claim 5, wherein the coefficients of frequency components other than both said specific frequency components and the DC component are increased.

7. The image processing method according to claim 5, wherein
in the case that the absolute value of the coefficient of each of said specific frequency components is larger than said predetermined value, a correction coefficient is multiplied to the coefficient of each of said frequency components, the lower the frequency component, the smaller the correction coefficient, and the higher the frequency component, the larger the correction coefficient.

8. The image processing method according to claim 5, wherein
in the case that the absolute value of the coefficient of each of said specific frequency components is smaller than said predetermined value, the coefficient of said frequency component is decreased.

9. An image processing apparatus
in which image data is transformed to spatial frequencies to obtain multiple frequency components, the obtained frequency components are processed, the processed frequency components are inversely transformed to image data, and the number of gray levels of the inversely transformed image data is decreased, comprising:
a comparison section for comparing the absolute value of each of specific multiple frequency components in the multiple frequency components obtained after transformation to spatial frequencies with a predetermined value in terms of magnitude;
a changing section for changing each of said specific frequency components on the basis of the result of the comparison;
an addition section for adding a specific value to each of said specific frequency components having been changed and other frequency components; and
an inverse transformation section for inversely transforming the frequency components, to which the specific values have been added, to image data, wherein
said specific frequency components in all frequency components are the frequency components on the low frequency side and the frequency components on the high frequency side only in the horizontal direction and the frequency components on the high frequency side only in the vertical direction of image data,
in the case that the absolute value of the coefficient of each of said specific frequency components is larger than said predetermined value, the coefficient of said frequency component is increased.

10. The image processing apparatus according to claim 9, wherein said changing section further decreases the coefficients of frequency components other than both said specific frequency components and the DC component.

11. The image processing apparatus according to claim 9, wherein
in the case that the absolute value of the coefficient of each of said specific frequency components is larger than said predetermined value, said changing section multiplies a correction coefficient to the coefficient of each of said frequency components, the lower the frequency component, the smaller the correction coefficient, and the higher the frequency component, the larger the correction coefficient.

12. The image processing apparatus according to claim 9, wherein
in the case that the absolute value of the coefficient of each of said specific frequency components is smaller than said predetermined value, the changing section decreases the coefficient of said frequency component.

13. An image processing apparatus
in which image data is transformed to spatial frequencies to obtain multiple frequency components, the obtained frequency components are processed, the processed frequency components are inversely transformed to image data, and the number of gray levels of the inversely transformed image data is decreased, comprising:
a comparison section for comparing the absolute value of each of specific multiple frequency components in the multiple frequency components obtained after transformation to spatial frequencies with a predetermined value in terms of magnitude;
a changing section for changing each of said specific frequency components on the basis of the result of the comparison;

an addition section for adding a specific value to each of said specific frequency components having been changed and other frequency components; and an inverse transformation section for inversely transforming the frequency components, to which the specific values have been added, to image data, wherein said specific frequency components in all frequency components are frequency components excluding both the frequency components on the low frequency side and the DC component, in the case that the absolute value of the coefficient of each of said specific frequency components is larger than said predetermined value, said changing section increases the coefficient of said frequency component.

14. The image processing apparatus according to claim 13, wherein said changing section further increases the coefficients of frequency components other than both said specific frequency components and the DC component.

15. The image processing apparatus according to claim 13, wherein in the case that the absolute value of the coefficient of each of said specific frequency components is larger than said predetermined value, said changing section multiplies a correction coefficient to the coefficient of each of said frequency components, the lower the frequency component, the smaller the correction coefficient, and the higher the frequency component, the larger the correction coefficient.

16. The image processing apparatus according to claim 13, wherein in the case that the absolute value of the coefficient of each of said specific frequency components is smaller than said predetermined value, the changing section decreases the coefficient of said frequency component.

17. An image forming apparatus comprising:

the image processing apparatus according to claim 9; and an image forming section that forms images processed using said image processing apparatus on sheets.

18. An image processing method in which image data is transformed to spatial frequencies to obtain multiple frequency components, the obtained frequency components are processed, the processed frequency components are inversely transformed to image data, and the number of gray levels of the inversely transformed image data is decreased, comprising the steps of:

comparing the absolute value of each of specific multiple frequency components in the multiple frequency components obtained after transformation to spatial frequencies with a predetermined value in terms of magnitude;

changing each of said specific frequency components on the basis of the result of the comparison;

adding a specific value to each of said specific frequency components having been changed and other frequency components; and inversely transforming the frequency components, to which the specific values have been added, to image data, wherein the specific value added in the adding step is selected from a collection of coefficients satisfying a blue noise distribution.

19. An image processing apparatus in which image data is transformed to spatial frequencies to obtain multiple frequency components, the obtained frequency components are processed, the processed frequency components are inversely transformed to image data, and the number of gray levels of the inversely transformed image data is decreased, comprising:

a comparison section for comparing the absolute value of each of specific multiple frequency components in the multiple frequency components obtained after transformation to spatial frequencies with a predetermined value in terms of magnitude;

a changing section for changing each of said specific frequency components on the basis of the result of the comparison;

an addition section for adding a specific value to each of said specific frequency components having been changed and other frequency components; and an inverse transformation section for inversely transforming the frequency components, to which the specific values have been added, to image data, wherein the specific value added by the addition section is selected from a collection of coefficients satisfying a blue noise distribution.

20. A non-transitory computer-readable recording medium encoded with instructions, wherein the instructions when executed by a computer cause the computer to perform an image processing method for transforming image data to spatial frequencies to obtain multiple frequency components, for processing the obtained frequency components, for inversely transforming the processed frequency components to image data, and for decreasing the number of gray levels of the inversely transformed image data, the method comprising:

comparing the absolute value of each of specific multiple frequency components in the multiple frequency components obtained after transformation to spatial frequencies with a predetermined value in terms of magnitude;

changing each of said specific frequency components on the basis of the result of the comparison;

adding a specific value to each of said specific frequency components having been changed and other frequency components; and inversely transforming the frequency components, to which the specific values have been added, to image data, wherein the specific value added in the adding step is selected from a collection of coefficients satisfying a blue noise distribution.

* * * * *